United States Patent [19]

Kamei et al.

[11] Patent Number: 4,554,202

[45] Date of Patent: Nov. 19, 1985

[54] PACKAGING CLOTH

[75] Inventors: Ryosuke Kamei, Yokohama; Keiitsu Kobayashi, Ayase; Akira Nakamura, Chigasaki; Toshikazu Shimamura, Ibaraki; Masamitsu Tsukada, Ibaraki; Hisashi Ono, Ibaraki, all of Japan

[73] Assignee: Showa Denko Kabushiki Kaisha, Tokyo, Japan

[21] Appl. No.: 628,379

[22] Filed: Jul. 6, 1984

[30] Foreign Application Priority Data

Jul. 8, 1983 [JP] Japan ................................ 58-123199
Jul. 15, 1983 [JP] Japan ................................ 58-127990
Aug. 12, 1983 [JP] Japan ................................ 58-146610

[51] Int. Cl.$^4$ ............................................. D03D 3/00
[52] U.S. Cl. .................................... 428/225; 428/229; 428/245; 428/253; 428/910

[58] Field of Search ................. 264/167, 210.8, 288.8; 428/229, 230, 245, 252, 253, 257, 258, 259, 910, 225; 156/308.2, 272.6

[56] References Cited

U.S. PATENT DOCUMENTS

| 4,348,437 | 9/1982 | Lustig et al. | 428/910 |
| 4,348,438 | 9/1982 | Canterino | 428/910 |
| 4,513,050 | 4/1985 | Ahao | 428/910 |

*Primary Examiner*—James J. Bell
*Attorney, Agent, or Firm*—Sughrue, Mion, Zinn, Macpeak and Seas

[57] ABSTRACT

A packing cloth comprising a woven or knitted fabric obtained by using, as at least a portion of either or both of warp and weft, thread or tape obtained by melt extrusion of a linear low-density ethylene polymer having a density of less than 0.945 g/cm$^3$ and having a branched short chain, followed by stretching at a temperature of less than 120° C. This packaging cloth has an improved tear strength and notch propagation resistance.

9 Claims, No Drawings ically used in shrink packaging or wrapping. These heat-shrinkable films are, however, poor in mechanical strength such as tear strength, tensile strength, and hardwearing properties and have notch propagation properties. Therefore, there are ongoing problems during storage or transportation wherein the packaging films are broken at the corner or edge portions of articles that are packaged. For these reasons, the above-mentioned known heat-shrinkable films have not been substantially used in heavy duty packaging but are used in light duty packaging in which the packaging film is subjected to a relatively small mechanical stress.

PACKAGING CLOTH

BACKGROUND OF THE INVENTION

1. Field of the Invention

The present invention relates to a low temperature shrinkable packaging cloth suitable for use in shrink packaging of articles to be packaged.

2. Description of the Prior Art

Heretofore, heat-shrinkable films derived from, for example, polyvinyl chloride and polyethylene having a branched long chain have been generally used in shrink packaging or wrapping. These heat-shrinkable films are, however, poor in mechanical strength such as tear strength, tensile strength, and hardwearing properties and have notch propagation properties. Therefore, there are ongoing problems during storage or transportation wherein the packaging films are broken at the corner or edge portions of articles that are packaged. For these reasons, the above-mentioned known heat-shrinkable films have not been substantially used in heavy duty packaging but are used in light duty packaging in which the packaging film is subjected to a relatively small mechanical stress.

Other problems of the above-mentioned heat shrinkable packaging films are that the shrinkable temperature is high and, therefore, the contents to be packaged are limited, and the direction of shrinkage is limited. For example, free selection of the direction and the amount of shrinkage such as (i) M-direction (i.e., "machine-direction") ultra-high shrinkage and T-direction (i.e., "transverse direction") low shrinkage, (ii) M-direction ultra-high shrinkage and T-direction ultra-high shrinkage, and (iii) M-direction low shrinkage and T-direction ultra-high shrinkage depending upon the shapes and conditions of articles to be packed cannot be attained. Further, it is impossible to expect that the shrinkage behavior in only a portion of the entire width in M-direction or T-direction is changed. Accordingly, the above-mentioned known heat shrinkable films can shrink-package articles having simple shapes, but cannot desirably shrink-package articles having complicated or not simple shapes.

Furthermore, the maximum width of the above-mentioned heat shrinkable films is limited to 1000 mm to 1500 mm under present film forming techniques. For this reason, the above-mentioned shrinkable films have not been used in heavy duty packaging.

SUMMARY OF THE INVENTION

Accordingly, the objects of the present invention are to eliminate the above-mentioned problems of the prior art and to provide a packaging cloth having a improved mechanical strength such as tear strength, improved notch propagation properties, and shrinkable at a relatively low temperature.

Other objects and advantages of the present invention will be apparent from the following description.

In accordance with the present invention, there is provided a packaging cloth comprising a woven or knitted fabric obtained by using, as at least a portion of either or both of warp and weft for a woven fabric or at least a portion of either or both of wales and courses for a knitted fabric, thread or tape obtained by melt extrusion of linear low-density ethylene polymer having a density of less than 0.945 g/cm$^3$ and having a branched short chain, followed by stretching at a temperature of less than 120° C.

DESCRIPTION OF THE PREFERRED EMBODIMENTS

Shrinkable Thermoplastic Resin

The heat shrinkable thermoplastic resins usable in the present invention include, for example, linear low-density ethylene polymers having a branched short chain and mixtures thereof with high-density ethylene polymers or propylene polymers.

The linear low-density ethylene polymers having a branched short chain must have a density of less than 0.945 g/cm$^3$, preferably less than 0.935 g/cm$^3$. These ethylene polymers may be copolymers of a major amount (e g., more than 50% by weight) of ethylene with a minor amount (e.g., less than 50% by weight) of an alpha-olefin such as propylene, butene-1, hexene-1, 4-methylpentene-1, and octene-1. These polymers can be produced in any conventional polymerization manner, e.g., vapor phase polymerization methods, slurry polymerization methods, or solution polymerization methods, in the presence of a transition-metal compound and an organic-metal compound catalyst.

The density of the linear low-density ethylene polymer must be less than 0.945 g/cm$^3$, preferably less than 0.935 g/cm$^3$ but not less than 0.905 g/cm$^3$. A density of the ethylene polymers of 0.945 g/cm$^3$ or more results in a decrease in the heat shrinkability, which in turn decreases shrink force and causes very poor shrink-packaging ability, although the strength of the cloth is not adversely affected. Contrary to this, a density of the ethylene polymers of less than 0.945 g/cm$^3$ can solve the heat shrinkability and the other problems. This is greatly improved by the use of the linear low-density ethylene polymers having a density of less than 0.935 g/cm$^3$. However, the use of the linear low-density ethylene polymers having a density of less than 0.905 g/cm$^3$ tends to cause a problem in the stretchability of the film.

The linear low-density ethylene polymers mentioned above must have a branched short chain. Although the length of the short chain is not specifically limited, the branched chains having 10 or less carbon atoms are preferable in the present invention. The use of, for example, low-density ethylene polymers having a branched long chain is not preferable because the stretchability and the heat shrink rate tend to deteriorate.

Although no special limitation is present in the melt flow rate (MFR) at 190° C. under 2.16 kg of the linear low-density ethylene polymer, the preferable MFR of the linear low-density ethylene polymers is 2.0 g/10 min or less in view of the strength and the heat shrinkability and is 0.1 g/10 min or more in view of the forming and the stretchability. Also, there is no limitation in a ratio of a high load melt flow rate (HLMFR at 190° C. under 21.6 kg) to a melt flow rate (MFR at 190° C. under 2.16 kg) (i.e., HLMFR/MFR) of the linear low-density ethylene polymer, which ratio relates to the stretchability, and the strength is preferably 40 or less.

According to the present invention, the mixtures of (A) 25 to 90 parts by weight of the above-mentioned linear low-density ethylene polymers having a density of less than 0.945 g/cm$^3$ and having a branched short chain and (B) 10 to 75 parts by weight of a high-density ethylene polymer having a density of not less than 0.945 g/cm$^3$ can be used as the above-mentioned resin.

The high-density ethylene polymers (B) used in the present invention having a density of not less than 0.945 g/cm$^3$ may be ethylene homopolymers and copolymers of a major amount (e.g., more than 50% by weight) of ethylene and a minor amount (e.g., less than 50% by weight) of an alpha-olefin such as propylene, butene-1, hexene-1, 4-methylpentene-1, and octene-1. These polymers or copolymers can be produced in any conventional polymerization manner, e.g., slurry polymerization methods, or solution polymerization methods, in the presence of a transition-metal compound and an organic-metal compound catalyst.

The density of the high-density ethylene polymers (B) must be 0.945 g/cm$^3$ or more. When the density of the high-density ethylene polymers is less than 0.945 g/cm$^3$, the stretchability and the strength of the mixtures becomes poor. The MFR of the ethylene polymers (B) is preferably 2 to 0.1 g/10 min and the ratio of HLMFR/MFR of the ethylene polymers (B) is desirably less than 40.

A weight ratio of the linear low-density ethylene polymers (A)/ the high-density ethylene polymer (B) is preferably 25–90/10–75, more preferably 30–60/40–70. When the amount of the linear low-density ethylene polymers (A) in the mixtures is more than the upper limit of the above-mentioned range, the stretchability and the strength become poor. Contrary to this, when the amount of the linear low-density ethylene polymers (A) in the mixtures is less than the lower limit of the above-mentioned range, the heat shrinkability decreases and, therefore, the shrink force decreases and the shrink-packaging ability becomes very poor. Furthermore, in the latter case, the stress relaxation and the creep resistance become worse and, therefore, the shrink force are relaxed during storage over a period of time.

Furthermore, the mixtures of the ethylene polymers (A) and (B) preferably have (i) a density of 0.920 g/cm$^3$ or more in view of the stretchability and the strength, (ii) a density of less than 0.945 g/cm$^3$ in view of the heat shrinkability, the creep resistance, and the heat sealing properties, (iii) an MFR of 2 g/10 min or less in view of the strength, (iv) a ratio of HLMFR/MFR of 10 or more in view of the formability, and (v) a ratio of HLMFR/MFR of 40 or less in view of the stretchability and the strength.

According to the present invention, the mixtures of (A) 20 to 90 parts by weight of a linear low-density ethylene polymer having a density of less than 0.945 g/cm$^3$ and having a branched short chain and (C) 10 to 80 parts by weight of a propylene polymer can also be used as the above-mentioned heat shrinkable resin.

The propylene polymers (C) usable in the present invention may be propylene homopolymer and copolymers of a major amount (e.g., more than 50% by weight) of propylene and a minor amount (e.g., less than 50% by weight) of an alpha-olefin such as ethylene. Preferable propylene polymers (C) are propylene homopolymers (i.e., polypropylenes) having an MFR of 0.5 to 8 g/10 min, more preferably 1 to 5 g/10 min, in view of the improvement in the shrink stress retention ability. Although there in no limitation in the MFR of the propylene polymers, the MFR of the propylene polymer is preferably 0.5 g/10 min or more in view of the formability and the stretchability but preferably 8 g/10 min or less in view of the heat shrinkability, when the blend amount of the propylene polymers in the mixture is relatively large.

In the present invention, a weight ratio of the linear low-density ethylene polymers (A)/the propylene polymers (C) is preferably 20–90/10–80, more preferably 40–70/30–60. When the amount of the linear low-density ethylene polymers (A) in the mixtures is more than 90 parts by weight, the shrinkage stress tends to decrease and to cause a problem in packaging, as the temperature of the shrunk cloth decreases from the predetermined shrink packaging temperature at an oven to ambient temperature, although there is no problem in the shrinkage amount. On the other hand, when the amount of the linear low-density ethylene polymers (A) in the mixtures is less than 20 parts by weight, the overall shrinkage amount tends to decrease and, therefore, the shrink packaging must be carried out at a remarkably high temperature, although there is no problem in the retention of the shrinkage stress.

Preparation of Thread or Tape

According to the present invention, the heat shrinkable thermoplastic resins are converted or extruded into threads or tapes. These threads or tapes can be prepared in any conventional manner, for example, an inflation method.

In the practice of the extrusion, the thermoplastic resins are extruded under a molten state through a slit of a die in the form of films and, then, after cooling, the extruded films are stretched at a temperature of less than 120° C., preferably 70° C. to 110° C. at a high stretching ratio of, for example, 2 to 9 times. Thus, the desired threads or tapes are prepared.

In the preparation of the threads or tapes, when the stretching temperature is 120° C. or more, not only does the stretchability become poor, but also there is increased slip between the molecule chains, which causes ineffective orientation during the stretching operation. Thus, the desired strength and heat shrinkage factor cannot be obtained. For this reason, the stretching temperature of less than 120° C. is used in the present invention. However, the stretching temperature of less than 70° C. tend to cause turning white, the decrease in the various properties, or the decrease in the stretchability of the threads or tapes. For this reason, the preferable stretching temperature is 70° C. to 110° C. Especially preferable is a stretching temperature of 85° C. to 105° C., at which the best stretchability and the most balanced desired properties can be obtained.

The stretching ratio of the extruded threads or tapes according to the present invention is preferably 2 to 8, more preferably 4 to 7, although the desired stretch ratio depends upon, for example, the desired strength and heat shrinkability. When the stretching ratio is less than 2, problems in the strength and heat shrinkability of the resultant threads or tapes are likely to occur. Contrary to this, a stretching ratio of more than 8 tends to cause problems in the stretchability. Furthermore, in order to decrease the natural shrinking properties after the stretching and to prevent the collapse of paper cores at winding, a thermal treatment immediately after the stretching may be, or be preferably, carried out under the conditions where the dimensions of the stretched threads or tapes are fixed.

Preparation of Woven or Knitted Fabric

According to the present invention, the desired shrink-packaging cloth can be obtained by using, as at least a portion of warp, at least a portion of weft, or at least a portion of both warp and weft for a woven fabric or using as at least a portion of the wales, at least a portion of the courses or at least a portion of both the wales and the courses for a knitted fabric, the threads or tapes having the high shrinkability and high strength obtained above. The weaving or knitting can be carried out by using any conventional textile weaving or knitting technique. The specification of the starting threads or tapes used is optionally selected depending upon the shapes of articles to be packaged. For example, for a woven fabric when packaging cloth shrinkable only in an M-direction (not shrinkable in a T-direction) is necessary, the above-mentioned threads or tapes obtained from the heat shrinkable thermoplastic resins are used only as a warp and conventional threads or tapes having a low heat shrinkage factor can be used as a weft. On the other hand, when packaging cloth shrinkable only in a T-directions (not shrinkable in an M-direction) is necessary the weaving specification in which the above-mentioned warp and weft are inverted may be used. When a woven packaging cloth shrinkable both in the M- and T-directions is necessary, the above-mentioned threads or tapes of the heat shrinkable thermoplastic resins according to the present invention may be used as both warp and weft.

Furthermore, when odd-shaped articles such as wheel discs of automobiles should be shrink-packaged, the desired woven shrink cloth can be obtained by using, as a warp, the above-mentioned threads or tapes having different heat shrinkage factors in accordance with the shapes of the articles (i.e., the warp having partially different shrinkage factors is used) and by using, as a weft, the threads or tapes having constant heat shrinkage factors. The heat shrinkage factors of the threads or tapes can be readily adjusted by changing the densities, melt flow rates, and blending ratios of the thermoplastic resins, the stretching temperatures, and the stretching ratios.

The die usable in the practice of the present invention can be any conventional die, for example, T-dies, circular dies, filament type dies, or band type rectangular dies. The cooling after extrusion can be carried out by using, for example, water cooling, air cooling, or chill roll cooling. The stretching can be effected by any known technique, for example, oven stretching, roll stretching, wet type stretching, or heat plate type stretching. Since the difference between the melting point and the optimum stretching temperature of the above-mentioned thermoplastic resins according to the present invention is large, the use of the heat plate type stretching is especially preferable in the practice of the present invention, because the heat plate type stretching is relatively low cost and facilitates the heat control.

Furthermore, the above-mentioned thermoplastic resins usable in the practice of the present invention can optionally contain any conventional additive, such as, antioxidants, ultraviolet light stabilizers, lubricants, pigments, and other resins, so long as the desired properties of the thermoplastic resins are not adversely affected.

Lamination

In another aspect of the present invention, there is provided a packaging cloth comprising a laminate containing a woven or knitted fabric derived from the above-mentioned threads or tapes. That is, the woven or knitted fabric obtained by using, as at least a portion of either or both of warp and weft for a woven fabric or at least a portion of either or both of the wales and courses for a knitted fabric, the thread or tape of the above-mentioned heat shrinkable thermoplastic resin is laminated onto both surfaces of at least one intermediate layer. The intermediated layer or layers are sandwiched by the two or more layers of the above-mentioned woven or knitted fabric.

The intermediate layer can be prepared in any conventional manner from any thermoplastic resin, preferably having good adhesion properties to the woven or knitted fabric. Examples of such resin are: linear low-density ethylene polymers or low-density ethylene polymers having a branched long chain for the woven or knitted fabric composed of the above-mentioned linear low-density ethylene polymer or the mixtures thereof; and propylene polymers for the woven or knitted fabric composed of a minor amount of the above-mentioned mixture of the ethylene polymers and a major amount of propylene polymers. These intermediate layers can be prepared in any known manner and optionally may be subjected to, for example, an anchor treatment to improve the adhesion properties. Although there is no limitation in the thickness of the intermediate layer so long as the desired adhesion properties can be obtained, the preferable thickness is 15 $\mu$m or more.

The use of the single woven or knitted packaging cloth mentioned hereinabove tends to cause the breakage of the shrink packaged cloth due to vibration during transportation in the case of heavy duty packaging. However, this tendency can be effectively improved by the use of the laminated packaging cloth according to the present invention. For example, when two layers of the above-mentioned packaging cloth are laminated, the dynamic load impact resistance against vibration breakage can be remarkably increased although the tensile strength increases only 2 times that of the single packaging cloth. That is, the dynamic load impact resistance test results are as follows:

(a) Commercially available low-density polyethylene shrink film having a thickness of 150 $\mu$m: 500 repeating times breakage,
(b) Single shrinkable packaging cloth according to the present invention: 2000 repeating times breakage,
(c) Sandwiched laminating of two layers of the single shrinkable packaging cloth (b) according to the present invention: 15,000 repeating times breakage,
(d) Sandwiched lamination of three layers of the single shrinkable packaging cloth (b) : no breakage by 30,000 repeating times.

The intermediate layer having a relatively low melting point is preferably used in the practice of the present invention, due to the fact that the heat shrinkability of the laminated packaging cloth is decreased at the packaging if two or more layers of the woven or knitted cloth are directly heat fused.

In a further aspect of the present invention, there is provided a packaging cloth comprising a laminate of the above-mentioned woven or knitted fabric onto one surface of a plastic film layer having a heat shrinkability identical or similar to that of the woven or knitted fabric layer.

The above-mentioned plastic film layers are those preferably having heat shrinkage ratio such that the heat shrinkage ratio of one layer is 0.7 to 1.3 times, more preferably 0.9 to 1.1 times, that of the other layer at a temperature between 80° C. and 110° C. Examples of such films are those obtained from low-density ethylene polymers, propylene polymers, polyvinyl chloride and having the desired heat shrinkage ratio by controlling the density, melt flow rates, the stretching temperature, and the stretching ratio. Although these is no specific limitation in the thickness of the film layer, the preferable thickness is 15 μm or more.

The lamination can be carried out in any conventional manner. For example, the heat shrinkable film can be laminated onto the woven or knitted cloth by using a conventional laminator. Although the similar resins are readily adhered to each other, the so-called anchor treatment can be advantageously used to improve the adhesion properties. Furthermore, three or more multilayers can be used in the preparation of the laminated packaging cloth according to the present invention.

Thus, according to the present invention, the laminated shrink packaging cloth suitable for use in a heavy packaging field can be provided.

EXAMPLES

The present invention will now be further illustrated by, but is by no means limited to, the following Examples together with Reference and Comparative Examples.

REFERENCE EXAMPLES 1 to 13 and a to c

The starting resins listed in Table 1 were melt extruded by using a 65 mmφ extruder provided with a 250 mmφ spiral die to form raw fabric films having a thickness of 50 μm by an air cooling inflation method. The films were stretched at the given stretching temperatures and stretching ratios by a heat plate type stretching machine provided after the slit. Thus, tapes of 1000 denier were obtained.

The physical properties of these tapes were as shown in Table 1.

As is clear from the results shown in Table 1, the tapes of Reference Examples 1 to 13 according to the present invention had good physical properties, but the physical properties of the tapes of Reference Examples a to c not according to the present invention were not balanced.

TABLE 1

| Reference Example No. | Starting resin | | | | | Stretching | | |
|---|---|---|---|---|---|---|---|---|
| | Resin | Comonomer with ethylene | Density *1 (g/cm$^3$) | MFR *1 (g/10 min) | HLMFR *1 / MFR | Temp. (°C.) | Ratio (Times) | Stretch-ability *2 |
| 1 | Linear polyethylene | Butene-1 | 0.921 | 0.8 | 32 | 97 | 7 | 5 |
| 2 | " | Hexene-1 | 0.930 | " | 34 | " | " | " |
| 3 | " | Butene-1 | 0.933 | 0.7 | 32 | " | " | " |
| 4 | " | " | 0.910 | 0.8 | 30 | " | " | 4 |
| 5 | " | " | 0.940 | " | 32 | " | " | 5 |
| 6 | " | " | 0.890 | " | 31 | " | " | 2 |
| 7 | " | " | 0.921 | 2.8 | 32 | " | " | 5 |
| 8 | " | " | " | 0.05 | 34 | " | " | 2 |
| 9 | " | " | 0.922 | 0.8 | 52 | " | " | 3 |
| 10 | " | " | 0.921 | " | 32 | 115 | " | 4 |
| 11 | " | " | " | " | " | 60 | " | 3 |
| 12 | " | " | " | " | " | 97 | 3.5 | 5 |
| 13 | " | " | " | " | " | " | 9.5 | 3 |
| a | Linear polyethylene | Butene-1 | 0.921 | 0.8 | 32 | 125 | 7 | 1 |
| b | High-density polyethylene | " | 0.953 | " | 30 | 120 | 7 | 5 |
| c | Low-density polyethylene having a branched long chain | " | 0.920 | " | 63 | 70 | 5.0 | Impossible |

| Reference Example No. | Physical properties of tape | | | | | | |
|---|---|---|---|---|---|---|---|
| | Tensile strength *3 (g/d) | Tensile elongation *3 (%) | Anti-splitting index *4 | Creep resistance *5 A (%) | Creep resistance *5 B (%) | Heat shrinkage ratio *6 (%) 80° C. | Heat shrinkage ratio *6 (%) 100° C. |
| 1 | 4.6 | 17.3 | 15 | 5.4 | 5.6 | 17.2 | 43.0 |
| 2 | 4.7 | 17.8 | 12 | 4.7 | 4.9 | 18.5 | 46.3 |
| 3 | 5.2 | 17.1 | 18 | 6.8 | 7.4 | 14.8 | 32.0 |
| 4 | 4.3 | 17.5 | 11 | 4.8 | 5.2 | 21.3 | 47.1 |
| 5 | 5.3 | 18.2 | 28 | 9.4 | 28.3 | 10.1 | 23.5 |
| 6 | 2.5 | 15.1 | 9 | 4.1 | 4.6 | 25.1 | 50.3 |
| 7 | 2.3 | 29.2 | 16 | 8.1 | 19.8 | 10.7 | 25.1 |
| 8 | 6.1 | 13.2 | 10 | 3.2 | 3.7 | 23.5 | 49.2 |
| 9 | 3.5 | 25.7 | 25 | 12.8 | 18.5 | 12.1 | 28.3 |
| 10 | 4.3 | 18.2 | 13 | 5.2 | 5.6 | 14.1 | 30.5 |
| 11 | " | 16.9 | 18 | 7.3 | 15.2 | 19.6 | 47.3 |
| 12 | 2.1 | 28.9 | 8 | 13.1 | 42.5 | 6.5 | 8.4 |
| 13 | 6.5 | 12.1 | 32 | 4.3 | 4.7 | 22.1 | 51.5 |
| a | 3.6 | 21.3 | 12 | 12.3 | 38.5 | 4.1 | 5.3 |
| b | 5.3 | 22.4 | 36 | 18.1 | 26.7 | 2.3 | 4.6 |
| c | — | — | — | — | — | — | — |

Remarks of Table 1
*1: JIS (Japanese Industrial Standard) K 6760
*2: Stretching breakage conditions for 1.5 hours operation
    1 . . . Very frequently, operation impossible
    2 . . . Frequently, many troubles in operation
    3 . . . Occur, some troubles in operation
    4 . . . Occur, no trouble in operation
    5 . . . None, no trouble in operation
*3: JIS L 1073
    Chuck distance = 300 mm
    Take-off speed = mm/min
*4: Under 0.1 g/d load, 100 times repeating in wire heald, No. of splitting × 10 after fatigue

TABLE 1-continued

*5: Under 1 g/d load at 20° C.
  (A) Extension % after 24 hours
  (B) Extension % after 100 hours
*6: After 1 minute dipping at each temperature in glycerol bath

EXAMPLES 1 to 4

Plain woven cloths of 1200 mm width were prepared by using the tapes of Reference Examples 1 and 7 as warp and weft at 10×10 picks/inch by a sulzer loom in Examples 1 and 4.

In Example 2, the woven cloth of Example 1 was laminated onto the one surface of a 25 μm thick film of low-density polyethylene having a density of 0.919 g/cm$^3$ and an MFR of 0.8 g/10 min. Furthermore, in Example 3, the woven cloth of Example 1 was laminated onto the both surfaces of the same film used in Example 2.

The physical properties of these woven cloths were as shown in Table 2.

COMPARATIVE EXAMPLES 1 to 3

A plain woven cloth was prepared in the same manner as in Example 1 by using the tape of Reference Example b in Comparative Example 1.

The physical properties of this woven cloth as well as a commercially available 150 μm thick shrink film of low-density polyethylene having a branched long-chain (comparative Example 2) and a commercially available 110 μm thick film of polyvinyl chloride shrink (Comparative Example 3) were determined. The results are shown in Table 2.

TABLE 2

| Woven cloth spec. | | | | Example No. | | | |
|---|---|---|---|---|---|---|---|
| | | | | 1 | 2 | 3 | 4 |
| | Tape of warp | | | Ref. Example 1 | Ref. Example 1 | Ref. Example 1 | Ref. Example 7 |
| | Tape of weft | | | Ref. Example 1 | Ref. Example 1 | Ref. Example 1 | Ref. Example 7 |
| | Laminate | | | None | One surface | Both surface | None |
| Tensile strength | kg/5 cm | JIS L-1068 | Warp | 57 | 57 | 100 | 31 |
| | | | Weft | 61 | 55 | 99 | 29 |
| Tensile elongation | % | " | Warp | 23 | 21 | 21 | 32 |
| | | | Weft | 20 | 22 | 23 | 34 |
| Tear strength | kg | JIS L-1079 | Warp | 18 | 19 | 19 | 17 |
| | | (Single tongue method) | Weft | 20 | 19 | 20 | 18 |
| Heat shrinkage ratio *1 | % | 80° C. | Warp | 16 | 17 | 11 | 10 |
| | | | Weft | 14 | 16 | 12 | 9 |
| | | 100° C. | Warp | 39 | 42 | 39 | 25 |
| | | | Weft | 37 | 39 | 38 | 24 |
| | | 110° C. | Warp | 60 | 63 | 61 | 32 |
| | | | Weft | 61 | 65 | 62 | 36 |
| Dart impact | kg-cm | ASTM D1709 *2 | | 225 or more | Same as left | Same as left | Same as left |
| Shrink packaging ability | °C. | Temp. (20 sec) *3 | | 170 | 180 | 190 | 205 |
| | sec | Time (185° C.) *4 | | 15 | 20 | 30 | 45 |
| | | Overall evaluation *5 | | ++ | ++ | ++ | + |
| Dynamic load impact resistance | Times | JIS L1021 *6 | | 1500 | 3000 | >3000 | 1500 |

| Woven cloth spec. | | | | Comparative Example | | |
|---|---|---|---|---|---|---|
| | | | | 1 | 2 | 3 |
| | Type of warp | | | Ref. Example b | Commercially available low-density polyethylene shrink film | Commercially available polyvinyl chloride shrink film |
| | Type of weft | | | Ref. Example b | | |
| | Laminate | | | None | None | None |
| Tensile strength | kg/5 cm | JIS L-1068 | Warp | 88 | 16.0 | 29.5 |
| | | | Weft | 80 | 15.0 | 52.2 |
| Tensile elongation | % | " | Warp | 23 | 940 | 400 |
| | | | Weft | 24 | 1020 | 87 |
| Tear strength | kg | JIS L-1079 | Warp | 17 | 1.6 | Very small |
| | | (Single tongue method) | Weft | 16 | 1.8 | " |
| Heat shrinkage ratio *1 | % | 80° C. | Warp | 2.4 | 0.4 | 6 |
| | | | Weft | 2.3 | 0.3 | 45 |
| | | 100° C. | Warp | 4.3 | 1.2 | 5 |
| | | | Weft | 4.6 | 0.3 | 51 |
| | | 110° C. | Warp | 6.7 | 5.7 | 6 |
| | | | Weft | 7.2 | 2.3 | 54 |
| Dart impact | kg-cm | ASTM D1709 *2 | | 225 or more | 30 | 19 |
| Shrink packaging ability | °C. | Temp. (20 sec) *3 | | Impossible | 195 | 180 |
| | sec | Time (185° C.) *4 | | " | 35 | 25 |
| | | Overall evaluation *5 | | − | + | + |
| Dynamic load impact resistance | Times | JIS L1021 *6 | | 1000 | 500 | 700 |

Remarks of Table 2
*1: After 1 minute dipping at each temperature in glycerol bath
*2: Dart; 38 mmφ half sphere, 1 m height
*3: Minimum temperature at which a wheel disc of an automobile can be tightly packaged for 20 sec, in a shrink tunnel after the wheel disc is wrapped by the sample cloth at 15% margin in length, followed by heat sealing of the edge portion.
*4: Minimum passing time for which the wheel disc can be tightly packaged at 150° C. as in item *3.
*5: ++ ... Very good + ... Good
− ... Poor
*6: Repeating time at which a hole is open.

REFERENCE EXAMPLES 14 to 20 and d

The composition containing (A) linear ethylenebutene-1 copolymers having a branched short chain and (B) polyethylenes having the weight ratios and the physical properties listed in Table 3 were inflation molded to form films having a thickness of 50 m. The films thus obtained were stretched under the conditions listed in Table 3 in the same manner as in Reference Examples 1 to 13 to produce tapes.

The physical properties of the tapes were as shown in Table 3.

As is clear from the results shown in Table 3, the tapes of Reference Examples 14 to 20 according to the present invention had good physical properties, whereas that of Reference Example d was not balanced.

EXAMPLES 5 to 7

Plain woven cloths of 2700 mm width were obtained by using the tapes of Reference Example 14 as warp and weft at 10×10 picks/inch by a 2700 mm wide sulzer loom in Example 5.

In Example 6, the woven cloth of Example 5 was laminated onto one surface of a 25 μm thick film of low-density polyethylene having a density of 0.919 g/cm$^3$ and an MFR of 0.8 g/10 min. Furthermore, in Example 7, the one-surface laminate was obtained in the same manner as in Example 6, except that the tape of Reference Example 16 was used in lieu of that of Reference Example 14.

The physical properties of these woven cloths and laminates were determined. The results are shown in Table 4.

COMPARATIVE EXAMPLES 4 and 5

In Comparative Examples 4 and 5, the physical properties of a commercially available 150 μm thick shrink film of low-density polyethylene having a branched long-chain (Comparative Example 4) and a commercially available 110 μm thick film of polyvinyl chloride shrink (Comparative Example 5) were determined. The results are shown in Table 4.

TABLE 3

| Reference Example No. | Resin Component of Composition | | | | | | | |
|---|---|---|---|---|---|---|---|---|
| | Linear Ethylene Polymer (A) | | | | Polyethylene (B) | | | |
| | Density *1 g/cm$^3$ | MFR *1 g/10 mm | HLMFR *1 MFR | Amount (wt. parts) | Density *1 g/cm$^3$ | MFR *1 g/10 min | HLMFR *1 MFR | Amount (wt. parts) |
| 14 | 0.921 | 0.8 | 32 | 75 | 0.954 | 0.8 | 31 | 25 |
| 15 | 0.921 | 0.8 | 32 | 30 | 0.954 | 0.8 | 31 | 70 |
| 16 | 0.923 | 3.0 | 34 | 75 | 0.954 | 0.8 | 31 | 25 |
| 17 | 0.921 | 0.8 | 32 | 75 | 0.953 | 3.0 | 31 | 25 |
| 18 | 0.923 | 0.9 | 52 | 75 | 0.954 | 0.8 | 31 | 25 |
| 19 | 0.921 | 0.05 | 34 | 75 | 0.954 | 0.8 | 31 | 25 |
| 20 | 0.921 | 0.8 | 32 | 75 | 0.954 | 0.8 | 31 | 25 |
| d | 0.921 | 0.8 | 32 | 75 | 0.954 | 0.8 | 31 | 25 |

| Reference Example No. | Composition | | | Stretching | | | Physical Properties of Tape | | |
|---|---|---|---|---|---|---|---|---|---|
| | Density *1 g/cm$^3$ | MFR *1 g/10 min | HLMFR *1 MFR | Temp (°C.) | Ratio (times) | *2 Stretchability | Tensile strength *3 (g/d) | Heat shrinkage ratio *4 | |
| | | | | | | | | 80° C. (%) | 100° C. (%) |
| 14 | 0.929 | 0.8 | 31 | 97 | 7.0 | 5 | 4.8 | 14.2 | 33.8 |
| 15 | 0.945 | 0.8 | 31 | 110 | 7.0 | 5 | 5.1 | 5.1 | 12.9 |
| 16 | 0.931 | 2.2 | 33 | 97 | 7.0 | 5 | 3.7 | 8.2 | 18.9 |
| 17 | 0.929 | 1.1 | 33 | 97 | 7.0 | 5 | 4.4 | 7.4 | 16.7 |
| 18 | 0.931 | 0.9 | 44 | 97 | 7.0 | 3 | 3.9 | 9.7 | 22.0 |
| 19 | 0.929 | 0.1 | 32 | 97 | 7.0 | 2 | 5.9 | 18.2 | 38.1 |
| 20 | 0.929 | 0.8 | 31 | 60 | 7.0 | 2 | 4.1 | 15.3 | 37.5 |
| d | 0.929 | 0.8 | 31 | 125 | 7.0 | 1 | 3.7 | 4.7 | 6.5 |

Remarks of Table 3
*1: JIS (Japanese Industrial Standard) K 6760
*2: Stretching breakage conditions for 1.5 hours operation
    1 ... Very frequently, operation impossible
    2 ... Frequently, many troubles in operation
    3 ... Occur, some troubles in operation
    4 ... Occur, no trouble in operation
    5 ... None, no trouble in operation
*3: JIS L 1073
    Chuck distance = 300 mm
    Take-off speed = 300 mm/min
*4: After 1 minute dipping at each temperature in glycerol bath

TABLE 4

| Woven cloth spec. | | | | Example 5 Ref. Example 14 | Example 6 Ref. Example 14 | Example 7 Ref. Example 16 | Comparative Example 4 Commercially available polyethylene shrink film | Comparative Example 5 Commercially available polyvinyl chloride shrink film |
|---|---|---|---|---|---|---|---|---|
| | Tape of warp | | | Ref. Example 14 | Ref. Example 14 | Ref. Example 16 | | |
| | Tape of weft | | | Ref. Example 14 | Ref. Example 14 | Ref. Example 16 | | |
| | Laminate | | | None | One surface | One surface | None | None |
| Tensile strength | Kg/5 cm | JIS L-1068 | Warp | 62 | 63 | 37 | 16 | 30 |
| | | " | Weft | 64 | 65 | 38 | 15 | 52 |
| Tensile elongation | % | " | Warp | 21 | 21 | 18 | 940 | 400 |
| | | | Weft | 20 | 22 | 19 | 1020 | 87 |
| Tear strength | Kg | JIS L-1079 (Single tongue method) | Warp | 19 | 20 | 16 | 1.6 | 0 |
| | | | Weft | 21 | 21 | 14 | 1.8 | 0 |
| Heat shrinkage ratio *1 | % | 80° C. | Warp | 14 | 16 | 8 | 0.4 | 6 |
| | | | Weft | 15 | 16 | 9 | −0.3 | 45 |
| | | 100° C. | Warp | 33 | 34 | 18 | 1.2 | 5 |
| | | | Weft | 33 | 38 | 17 | −0.3 | 51 |
| | | 110° C. | Warp | 48 | 48 | 28 | 5.7 | 6 |
| | | | Weft | 49 | 49 | 29 | 2.3 | 54 |
| Dart impact | Kg/cm | ASTMD 1709 *2 | | >225 | >225 | >225 | 30 | 19 |
| Shrink packaging properties | °C. sec | Temp. (20 sec) *3 | | 175 | 180 | 190 | 195 | 180 |
| | | Time (185° C.) *4 | | 15 | 20 | 30 | 35 | 25 |
| | | Overall evaluation *5 | | ++ | ++ | ++ | + | + |
| Dynamic load impact resistance | times | JIS L1021 *6 | | 2000 | 3000 | 3000 | 500 | 700 |

Remarks of Table 4
*1: After 1 minute dipping at each temperature in glycerol bath
*2: Dart; 38 mmφ half sphere, 1 m height
*3: Minimum temperature at which a wheel disc of an automobile can be tightly packaged for 20 sec. in a shrink tunnel after the wheel disc is wrapped by the sample cloth at 15% margin in length, followed by heat sealing of the edge portion.
*4: Minimum passing time for which the wheel disc can be tightly packaged at 150° C. as in item *3.
*5: ++ ... Very good
  + ... Good
  − ... Poor
*6: Repeating time at which a hole is open.

REFERENCE EXAMPLES 21 to 31 and e

The compositions containing (A) linear ethylenebutene-1 copolymers and having a branched short chain, having the physical properties listed in Table 5 and (B) propylenehomopolymer having the physical properties listed in Table 5 in Examples 21 to 30 or propyleneethylene (4% by weight) random copolymer in Example 31 were inflation molded to obtain films having a thickness of 50 μm. The films thus obtained were stretched under the conditions listed in Table 5 in the same manner as in Reference Examples 1 to 13 to produce tapes of 1000 denier.

The physical properties of the tapes were as shown in Table 5.

As is clear from the results shown in Table 5, the tapes of Reference Examples 21 to 31 according to the present invention had good physical properties, whereas that of Reference Example e was not balanced.

TABLE 5

| Reference Example No. | Linear polyethylene *1 Density g/cm³ | Linear polyethylene *1 MFR g/10 min | Linear polyethylene *1 HLMFR/MFR | Parts by weight | Polypropylene *1 Density g/cm³ | Polypropylene *1 MFR g/10 min | Parts by weight | Stretching Temp. (°C.) | Stretching Ratio (times) | *2 Stretchability | 3* Tensile strength (g/d) | *4 Heat shrinkage ratio 80° C. (%) | *4 Heat shrinkage ratio 100° C. (%) |
|---|---|---|---|---|---|---|---|---|---|---|---|---|---|
| 21 | 0.921 | 0.8 | 32 | 75 | 0.900 | 1.0 | 25 | 97 | 7.0 | 5 | 5.2 | 12.2 | 30.6 |
| 22 | 0.921 | 0.8 | 32 | 30 | " | " | 70 | 110 | 7.0 | 5 | 5.5 | 4.3 | 10.8 |
| 23 | 0.923 | 3.0 | 34 | 75 | " | " | 25 | 97 | 7.0 | 5 | 4.1 | 7.1 | 16.3 |
| 24 | 0.921 | 0.8 | 32 | 75 | " | 3.0 | 25 | 97 | 7.0 | 5 | 4.8 | 6.5 | 13.8 |
| 25 | 0.923 | 0.9 | 52 | 75 | " | 1.0 | 25 | 97 | 7.0 | 3 | 4.4 | 8.6 | 20.5 |
| 26 | 0.921 | 0.05 | 34 | 75 | " | " | 25 | 97 | 7.0 | 3 | 5.6 | 14.6 | 35.1 |
| 27 | 0.921 | 0.8 | 32 | 75 | " | " | 25 | 60 | 7.0 | 3 | 4.8 | 12.8 | 34.5 |
| 28 | 0.921 | 0.8 | 32 | 75 | " | " | 25 | 125 | 7.0 | 1 | 4.1 | 4.8 | 11.8 |
| 29 | 0.921 | 0.8 | 32 | 75 | " | 9 | 25 | 97 | 7.0 | 5 | 4.6 | 5.1 | 12.0 |
| 30 | 0.921 | 0.8 | 32 | 75 | " | 0.4 | 25 | 97 | 7.0 | 3 | 5.4 | 13.8 | 32.6 |
| 31 | 0.921 | 0.8 | 32 | 75 | " | 1.0 | 25 | 97 | 7.0 | 4 | 4.7 | 13.2 | 31.3 |
| e | 0.947 | 0.6 | 30 | 75 | " | " | 25 | 105 | 7.0 | 5 | 5.4 | 2.1 | 3.8 |

Remarks of Table 5
*1: JIS K 6760 (polyethylene)
    JIS K 6758 (polypropylene)
*2: Stretching breakage conditions for 1.5 hours TABLE 5-continued

| Reference Example No. | Resin Component of Composition | | | | | | | Stretching | | | Physical Properties of Tape | | |
|---|---|---|---|---|---|---|---|---|---|---|---|---|---|
| | Linear polyethylene | | | | Polypropylene | | | | | | 3* Tensile strength (g/d) | *4 Heat shrinkage ratio | |
| | *1 Density g/cm³ | *1 MFR g/10 min | *1 HLMFR MFR | Parts by weight | *1 Density g/cm³ | *1 MFR g/10 min | Parts by weight | Temp. (°C.) | Ratio (times) | *2 Stretch- ability | | 80° C. (%) | 100° C. (%) |

1 . . . Very frequently, operation impossible
2 . . . Frequently, many troubles in operation
3 . . . Occur, some troubles in operation
4 . . . Occur, no trouble in operation
5 . . . None, no trouble in operation
*3: JIS L 1073
  Chuck distance = 300 mm
  Take-off speed = 300 mm/min
*4: After 1 minute dipping at each temperature in glycerol bath

EXAMPLES 8 to 11

A plain woven cloth of 2700 mm width was obtained by using the tapes of Reference Example 21 as warp and weft at 10×10 picks/inch by a 2700 mm wide sulzer loom in Example 8.

In Example 9, the woven cloth of Example 8 was laminated onto one surface of a 25 μm thick film of low-density polyethylene having a density of 0.919 g/cm³ and an MFR of 0.8 g/10 min. On the other hand, in Example 10, the woven cloth of Example 8 was laminated onto the both surfaces of the same film as used in Example 9. Furthermore, in Example 11, the one-surface laminate was obtained in the same manner as in Example 6, except that the tape of Reference Example 23 was used in lieu of that of Reference Example 21.

The physical properties of these woven cloths and laminates were determined. The results are shown in Table 6.

COMPARATIVE EXAMPLES 6 to 8

In Comparative Example 6, plain woven clothes and one-surface laminates thereof was prepared in the same manner as in Example 9, except that the tapes of Reference Example e was used.

The physical properties of this woven cloth as well as a commercially available 150 μm thick shrink film of low-density polyethylene having a branched long-chain (Comparative Example 7), and a commercially available 110 μm thick film of polyvinyl chloride shrink (Comparative Example 8) were determined. The results are shown in Table 6.

TABLE 6

| Woven cloth spec. | | | | Example | | | |
|---|---|---|---|---|---|---|---|
| | | | | 8 | 9 | 10 | 11 |
| | Tape of warp | | | Ref. Example 21 | Ref. Example 21 | Ref. Example 21 | Ref. Example 23 |
| | Tape of weft | | | Ref. Example 21 | Ref. Example 21 | Ref. Example 21 | Ref. Example 23 |
| | Laminate | | | None | One surface | Sandwich | One surface |
| Tensile strength | kg/5 cm | JIS L-1068 | Warp | 68 | 69 | 145 | 42 |
| | | | Weft | 65 | 67 | 142 | 40 |
| Tensile elongation | % | " | Warp | 21 | 21 | 18 | 18 |
| | | | Weft | 20 | 22 | 19 | 19 |
| Tear strength | kg | JIS L-1079 (Single tongue method) | Warp | 19 | 20 | 36 | 16 |
| | | | Weft | 21 | 21 | 24 | 14 |
| Heat shrinkage ratio *1 | % | 80° C. | Warp | 13 | 16 | 10 | 8 |
| | | | Weft | 12 | 16 | 8 | 7 |
| | | 100° C. | Warp | 32 | 34 | 28 | 18 |
| | | | Weft | 31 | 32 | 23 | 16 |
| | | 110° C. | Warp | 42 | 44 | 35 | 27 |
| | | | Weft | 41 | 42 | 32 | 25 |
| Dart impact | kg/cm | ASTMD 1709 *2 | | >225 | >225 | >225 | >225 |
| Shrink packaging properties | °C. | Temp. (20 sec) *3 | | 175 | 180 | 185 | 180 |
| | sec | Time (185° C.) *4 | | 15 | 20 | 20 | 20 |
| | | Overall evaluation *5 | | ++ | ++ | ++ | ++ |
| Dynamic load impact resistance | | JIS L1021 *6 | | 2500 | 3500 | 16000 | 3500 |
| Shrink stress retention | % | 100° C.→20° C. *7 | Warp | 106 | 110 | 110 | 110 |
| | | | Weft | 108 | 108 | 108 | 108 |
| | | | | | Comparative Example | | |
| | | | | | 6 | 7 | 8 |
| Woven cloth spec. | | Tape of warp | | | Ref. Example e | Commercially available polyethylene shrink film | Commercially available polyvinyl chloride shrink film |
| | | Tape of weft | | | Ref. Example e | Commercially available polyethylene shrink film | Commercially available polyvinyl chloride shrink film |
| | | Laminate | | | One surface | None | None |
| Tensile strength | kg/5 cm | JIS L-1068 | Warp | | 74 | 16 | 30 |
| | | | Weft | | 71 | 15 | 52 |

TABLE 6-continued

| Tensile elongation | % | " | Warp | 22 | 940 | 400 |
|---|---|---|---|---|---|---|
| | | | Weft | 21 | 1020 | 87 |
| Tear strength | kg | JIS L-1079 | Warp | 19 | 1.6 | 0 |
| | | (Single tongue method) | Weft | 18 | 1.8 | 0 |
| Heat shrinkage | % | 80° C. | Warp | 1.8 | 0.4 | 6 |
| ratio *1 | | | Weft | 2.0 | −0.3 | 45 |
| | | 100° C. | Warp | 3.9 | 1.2 | 5 |
| | | | Weft | 3.8 | −0.3 | 51 |
| | | 110° C. | Warp | 5.8 | 5.7 | 6 |
| | | | Weft | 5.6 | 2.3 | 54 |
| Dart impact | kg/cm | ASTM D 1709 *2 | | >225 | 30 | 19 |
| Shrink packaging | °C. | Temp. (20 sec) *3 | | impossible | 195 | 180 |
| properties | sec | Time (185° C.) *4 | | " | 35 | 25 |
| Dynamic load impact resistance | | Overall evaluation *5 | | — | + | + |
| | | JIS L1021 *6 | | 3500 | 500 | 700 |
| Shrink stress retention | % | 100° C.→20° C. *7 | Warp | 85 | 120 | 142 |
| | | | Weft | 86 | 118 | 140 |

Remarks of Table 6
*1: After 1 minute dipping at each temperature in glycerol
*2: Dart; 38 mmφ half sphere, 1 m height
*3: Minimum temperature at which a wheel disc of an automobile can be tightly packaged for 20 sec, in a shrink tunnel after the wheel disc is wrapped by the sample cloth at 15 cm margin in length, followed by heat sealing of the edge portion.
*4: Minimum passing time for which the wheel disc can be tightly packaged at 150° C. as in item *3.
*5: + + . . . Very good
+ . . . Good
− . . . Poor
*6: Repeating time at which a hole is open.
*7: $\frac{\text{Shrink stress at 20° C.}}{\text{Shrink stress at 100° C.}} \times 100 \, (\%)$
Sample width = 20 mm, Chuck distance = 150 mm

REFERENCE EXAMPLES 32 to 34

From the starting resins listed in Table 7, raw fabric films having a thickness of 50 μm were obtained through a 65 mmφ extruder and a 250 mmφ spiral die by using an air cooling inflation method. After the slit, the films were stretched at the temperatures and the stretching ratios listed in Table 7. Thus, tapes of 1000 deniers were obtained.

The tensile strengths and the heat shrinkage factors of the tapes were determined. The results are shown in Table 7.

the both surface of a 25 μm thick film of low-density polyethylene having a density of 0.919 g/cm³ and an MFR of 0.8 g/10 min having a branched long chain in Examples 12, 13, and 14, respectively. In Example 15, the woven cloths of Example 14 were sandwich laminated in the same manner as in Example 14 to obtain a sandwich type 5 layer packaging cloth.

The physical properties of these woven cloths were as shown in Table 8.

COMPARATIVE EXAMPLES 9 and 10

In Comparative Examples 9 and 10, the physical

TABLE 7

| Reference Example | Starting resin component | | | | | Stretching Temp. (°C.) | Stretching ratio (times) | *3 Tensile strength (g/d) | Heat *4 shrinkage ratio | |
|---|---|---|---|---|---|---|---|---|---|---|
| | Resin | Density g/cm³ | MFR *2 g/10 min | HLMFR *2 MFR | | | | | 80° C. (%) | 100° C. (%) |
| 32 | Linear ethylene polymer *1 | 0.921 | 0.8 | 32 | 100 | 97 | 7 | 4.7 | 17.0 | 43.0 |
| 33 | Linear ethylene polymer *1 | 0.921 | 0.8 | 32 | 75 | 97 | 7 | 4.8 | 14.2 | 33.8 |
| | High-density polyethylene | 0.954 | 0.8 | 31 | 25 | | | | | |
| 34 | Linear ethylene polymer *1 | 0.921 | 0.8 | 32 | 75 | 97 | 7 | 5.2 | 12.2 | 30.6 |
| | Propylene homopolymer | 0.900 | 1.0 | — | 25 | | | | | |

*1: Copolymer of ethylene and butene-1 having a branched short chain
*2: JIS K 6760 (polyethylene)
   JIS K 6758 (polypropylene)
*3: JIS L 1073
   Chuck distance = 300 mm, Take-off speed = 300 mm/min.
*4: After 1 minute dipping at each temperature in glycerol bath

EXAMPLES 12 to 15 and COMPARATIVE EXAMPLES 13 to 17

Plain woven cloths were prepared by using the tapes of Reference Examples 32, 33, and 34 as warp and weft at 10×10 tapes/inch in a 2700 mm wide Sulzer loom and, then, these cloths were sandwich laminated onto properties of a commercially available 150 μm thick shrink film of low-density polyethylene having a branched long-chain (Comparative Example 9) and a commercially available 110 μm thick film of polyvinyl chloride shrink (Comparative Example 10) were determined. The results are shown in Table 8.

Example 11, the physical properties of the shrink film are also shown in Table 10.

TABLE 8

|  |  |  |  | Example | | | | Comparative Example | |
|---|---|---|---|---|---|---|---|---|---|
|  |  |  |  | 12 | 13 | 14 | 15 | 9 | 10 |
| Woven cloth spec. |  | Tape of warp |  | Ref. Example 32 | Ref. Example 33 | Ref. Example 34 | Ref. Example 34 | Commercially available polyethylene shrink film None | Commercially available polyvinyl chloride shrink film None |
|  |  | Tape of weft |  | Ref. Example 32 | Ref. Example 33 | Ref. Example 34 | Ref. Example 34 | | |
|  |  | Laminate |  | Sandwich | Sandwich | Sandwich | Sandwich (3 cloth) | | |
| Tensile strength | kg/5 cm | JIS L-1068 | Warp | 75 | 134 | 145 | 140 | 16 | 30 |
|  |  |  | Weft | 70 | 130 | 142 | 136 | 15 | 52 |
| Tensile elongation | % | " | Warp | 25 | 20 | 18 | 20 | 940 | 400 |
|  |  |  | Weft | 27 | 21 | 19 | 19 | 1020 | 87 |
| Tear strength | kg | JIS L-1079 (Single tongue method) | Warp | 17 | 24 | 26 | 32 | 1.6 | 0 |
|  |  |  | Weft | 16 | 22 | 24 | 30 | 1.8 | 0 |
| Heat shrinkage ratio *1 | % | 80° C. | Warp | 15 | 11 | 10 | 9 | 0.4 | 6 |
|  |  |  | Weft | 15 | 9 | 8 | 7 | −0.3 | 45 |
|  |  | 100° C. | Warp | 39 | 30 | 28 | 27 | 1.2 | 5 |
|  |  |  | Weft | 36 | 27 | 23 | 22 | −0.3 | 51 |
|  |  | 110° C. | Warp | 46 | 37 | 35 | 35 | 5.7 | 6 |
|  |  |  | Weft | 43 | 34 | 32 | 32 | 2.3 | 54 |
| Dart impact | kg/cm | ASTMD 1709 *2 |  | >225 | >225 | >225 | >225 | 30 | 19 |
| Shrink packaging properties | °C. | Temp. (20 sec) *3 |  | 180 | 180 | 185 | 185 | 195 | 180 |
|  | sec | Time (185° C.) *4 |  | 20 | 20 | 20 | 20 | 35 | 25 |
|  | — | Overall evaluation *5 |  | ++ | ++ | ++ | ++ | + | + |
| Dynamic load import resistance | times | JIS L1021 *6 |  | 12000 | 15000 | 16000 | 30000 | 500 | 700 |

Remarks of Table 8
*1: After 1 minute dipping at each temperature in glycerol bath
*2: Dart; 38 mmφ half sphere, 1 m height
*3: Minimum temperature at which a wheel disc of an automobile can be tightly packaged for 20 sec. in a shrink tunnel after the wheel disc is wrapped by the sample cloth at 15% margin in length, followed by heat sealing of the edge portion.
*4: Minimum passing time for which the wheel disc can be tightly packaged at 150° C. as in item *3.
*5: ++ ... Very good
+ ... Good
− ... Poor
*6: Repeating time at which a hole is open.

REFERENCE EXAMPLE 35, EXAMPLE 16 and COMPARATIVE EXAMPLE 11

The starting resin listed in Table 9 was melt extruded through a 65 mmφ extruder provided with a 250 mmφ spiral die to produce raw fabric film having a thickness of 50 μm. The film thus obtained was stretched at the stretching temperature and ratio listed in Table 9 by using a heat plate type stretching machine after the slit. Thus, a tape of 1000 denier having a width of 7 mm was obtained.

The tensile strength and heat shrinkage factor were determined. The results are shown in Table 9.

A plain woven cloth was prepared by using the tape thus obtained as warp and weft at 10×10 picks/inch by a 2700 mm wide sulzer loom. The physical properties of this plain woven cloth was determined. The results are shown in Table 10 as Reference Example 35.

The woven cloth obtained above was laminated under pressure by means of rollers onto a 50 μm thick shrink film of commercially available low-density polyethylene having a branched long chain by melt extruding low-density polyethylene having a density of 0.919 g/cm³ and an MFR of 0.8 g/10 min to form an adhesive layer having a thickness of 25 μm.

The physical properties of the laminated packaging cloth thus obtained were determined. The results are shown in Table 10 as Example 16. As Comparative Example 11, the physical properties of the shrink film are also shown in Table 10.

The tear strength of the packaging material according to the present invention is extremely superior to that of the comparative shrink film. Furthermore, 10 rims of a bicycle were shrink packaged by the packaging material according to the present invention and the shrink film, good packaging finish was obtained in each case.

TABLE 9

| Starting resin components | | |
|---|---|---|
| Linear ethylene polymer *1 | | |
| Density | g/cm³ | 0.921 |
| MFR *2 | g/10 min | 0.8 |
| Parts by weight | | 75 |
| Propylene homopolymer | | |
| Density | g/cm³ | 0.900 |
| MFR *2 | g/10 min | 1.0 |
| Parts by weight | | 25 |
| Stretching | | |
| Stretching temperature | (°C.) | 97 |
| Stretching ratio | (time) | 7 |
| Physical properties | | |
| Tensile strength *3 | (g/d) | 5.2 |
| Heat shrinkage ratio *4 | | |
| 80° C. | (%) | 12.2 |
| 100° C. | (%) | 30.6 |

*1: Copolymer of ethylene and butene-1
*2: JIS K 6760 (polyethylene)
JIS K 6758 (polypropylene)
*3: JIS L 1073
Chuck distance = 300 mm
Take-off speed = 300 mm/min
*4: After 1 minute dipping at each temperature in glycerol bath

TABLE 10

| | | | | Reference Example 35 | Example 16 | Comparative Example 11 |
|---|---|---|---|---|---|---|
| Tensile strength | kg/5 cm | JIS L-1068 | Warp | 68 | 69 | 5 |
| | | | Weft | 65 | 66 | 5 |
| Tensile elongation | % | " | Warp | 21 | 21 | 900 |
| | | | Weft | 20 | 20 | 950 |
| Tear strength | kg | JIS L-1079 | Warp | 19 | 20 | 0.8 |
| | | (single tongue method) | Weft | 21 | 21 | 0.9 |
| Heat shrinkage ratio *1 | % | 80° C. | Warp | 13 | 13 | 15 |
| | | | Weft | 12 | 12 | 14 |
| | | 100° C. | Warp | 32 | 32 | 37 |
| | | | Weft | 31 | 31 | 36 |
| | | 110° C. | Warp | 42 | 42 | 48 |
| | | | Weft | 41 | 41 | 46 |
| Dart impact | kg/cm | ASTMD 170 g *2 | | >225 | >225 | 30 |
| Shrink packaging properties | °C. | Temp. (20 sec) *3 | | 175 | 175 | 170 |
| | sec | Time (185° C.) *4 | | 15 | 15 | 14 |
| | | Overall evaluation *5 | | ++ | ++ | ++ |
| Dynamic load impact resistance | time | JIS L-1021 *6 | | 2500 | 4500 | 200 |

Remarks of Table 10
*1: After 1 minute dipping at each temperature in glycerol bath
*2: Dart; 38 mm$\phi$ half sphere, 1 m height
*3: Minimum temperature at which a wheel disc of
an automobile can be tightly packaged
for 20 sec, in a shrink tunnel after the wheel disc is wrapped by the sample cloth at 15% margin in length, followed by heat sealing of the edge portion.
*4: Minimum passing time for which the wheel disc can be tightly packaged at 150° C. as in item *3.
*5: ++ ... Very good
+ ... Good
− ... Poor
*6: Repeating time at which a hole is open.

We claim:

1. A packaging cloth comprising a woven or knitted fabric obtained by using, as at least a portion of either or both of warp and weft for a woven fabric or at least a portion of either or both of wales and courses for a knitted fabric, thread or tape obtained by melt extrusion of linear low-density ethylene polymer having a density of less than 0.945 g/cm³ and having a branched short chain, followed by stretching at a temperature of less than 120° C.

2. A packaging cloth as claimed in claim 1, wherein the thread or tape is that obtained by melt extrusion of (A) 25 to 90 parts by weight of a linear low-density ethylene polymer having a density of less than 0.945 g/cm³ and having a branched short chain and (B) 10 to 75 parts by weight of a high-density ethylene polymer haing a density of not less than 0.945 g/cm³, followed by stretching at a temperature of less than 120° C.

3. A packaging cloth as claimed in claim 1, wherein the thread or tape is that obtained by melt extrusion of (A) 20 to 90 parts by weight of a linear low-density ethylene polymer having a density of less than 0.945 g/cm³ and having a branched short chain and (C) 10 to 80 parts by weight of a propylene polymer.

4. A packaging cloth comprising a laminate of a woven or knitted fabric obtained by using, as at least a portion of either or both of warp and weft for a woven fabric or at least a portion of either or both of wales and courses for a knitted fabric, thread or tape obtained by melt extrusion of linear low-density ethylene polymer having a density of less than 0.945 g/cm³ and having a branched short chain, followed by stretching at a temperature of less than 120° C., said laminate being produced by laminating the woven or knitted fabric onto both surfaces of an intermediate layer.

5. A packaging cloth as claimed in claim 4, wherein the thread or tape is that obtained by melt extrusion of (A) 25 to 90 parts by weight of a linear low-density ethylene polymer having a density of less than 0.945 g/cm³ and having a brached short chain and (B) 10 to 75 parts by weight of a high-density ethylene polymer having a density of not less than 0.945 g/cm³, followed by stretching at a temperature of less than 120° C.

6. A packaging cloth as claimed in claim 4, wherein the thread or tape is that obtained by melt extrusion of (A) 20 to 90 parts by weight of a linear low-density ethylene polymer having a density of less than 0.945 g/cm³ and having a branched short chain and (C) 10 to 80 parts by weight of a propylene polymer.

7. A packaging cloth comprising a laminate of a woven or knitted fabric obtained by using, as at least a portion of either or both of warp and weft for a woven fabric or at least a portion of either or both of wales and courses for a knitted fabric, thread or tape obtained by melt extrusion of linear low-density ethylene polymer having a density of less than 0.945 g/cm³ and having a branched short chain, followed by stretching at a temperature of less than 120° C., said laminate being produced by laminating the woven or knitted fabric onto one surface of a film having heat shrinkability identical or similar to that of the woven or knitted fabric.

8. A packaging cloth as claimed in claim 7, wherein the thread or tape is that obtained by melt extrusion of (A) 25 to 90 parts by weight of a linear low-density ethylene polymer having a density of less than 0.945 g/cm³ and having a branched short chain and (B) 10 to 75 parts by weight of a high-density ethylene polymer having a density of not less than 0.945 g/cm³, followed by stretching at a temperature of less than 120° C.

9. A packaging cloth as claimed in claim 7, wherein the thread or tape is that obtained by melt extrusion of (A) 20 to 90 parts by weight of a linear low-density ethylene polymer having a density of less than 0.945 g/cm³ and having a branched short chain and (C) 10 to 80 parts by weight of a propylene polymer.

* * * * *

UNITED STATES PATENT AND TRADEMARK OFFICE
CERTIFICATE OF CORRECTION

PATENT NO. : 4,554,202
DATED     : November 19, 1985
INVENTOR(S) : Ryosuke Kamei et al.

It is certified that error appears in the above-identified patent and that said Letters Patent is hereby corrected as shown below:

On the title page Item /73/ should read

-- /73/ Assignee:   Showa Denko Kabushiki Kaisha,
                    Tokyo, Japan  and
                    Taisei Polymer Co., Ltd.,
                    Tokyo, Japan   --.

Signed and Sealed this

Twenty-seventh Day of May 1986

[SEAL]

Attest:

DONALD J. QUIGG

Attesting Officer

Commissioner of Patents and Trademarks